(12) United States Patent
Jensen et al.

(10) Patent No.: US 12,338,149 B2
(45) Date of Patent: Jun. 24, 2025

(54) SALT-LEVEL SENSOR FOR WATER SOFTENER

(71) Applicant: MJAM Global LLC, Salt Lake City, UT (US)

(72) Inventors: Michael Glenn Jensen, St. George, UT (US); Andrew Stein McMullin, West Jordan, UT (US)

( * ) Notice: Subject to any disclaimer, the term of this patent is extended or adjusted under 35 U.S.C. 154(b) by 582 days.

(21) Appl. No.: 17/564,183

(22) Filed: Dec. 28, 2021

(65) Prior Publication Data

US 2022/0204373 A1    Jun. 30, 2022

Related U.S. Application Data

(60) Provisional application No. 63/131,705, filed on Dec. 29, 2020.

(51) Int. Cl.
| | | |
|---|---|---|
| *G01B 11/14* | (2006.01) | |
| *C02F 5/00* | (2023.01) | |
| *G01B 11/22* | (2006.01) | |
| *G01S 15/08* | (2006.01) | |
| *G01S 17/08* | (2006.01) | |

(52) U.S. Cl.
CPC ............... *C02F 5/00* (2013.01); *G01B 11/14* (2013.01); *G01B 11/22* (2013.01); *G01S 15/08* (2013.01); *G01S 17/08* (2013.01); *C02F 2201/002* (2013.01); *C02F 2209/008* (2013.01)

(58) Field of Classification Search
CPC ......... G01B 11/14; G01B 11/22; G01S 15/88; G01S 17/88; C02F 2201/002
See application file for complete search history.

(56) References Cited

U.S. PATENT DOCUMENTS

| | | | | |
|---|---|---|---|---|
| 2011/0083504 | A1* | 4/2011 | Unger | G01F 22/00 73/304 C |
| 2016/0292990 | A1* | 10/2016 | Pesz | G01F 23/0007 |
| 2018/0111538 | A1* | 4/2018 | Detter | B60P 1/42 |
| 2020/0255301 | A1* | 8/2020 | Budampati | C02F 1/42 |

OTHER PUBLICATIONS

Longbottom, Frank, and Halit Eren. "Ultrasonic multiple-sensor solid level measurements." Conference Proceedings. 10th Anniversary. IMTC/94. Advanced Technologies in I & M. 1994 IEEE Instrumentation and Measurement Technolgy Conference (Cat. No. 94CH3424-9). IEEE, 1994. (Year: 1994).*

* cited by examiner

*Primary Examiner* — Bradley R Spies
(74) *Attorney, Agent, or Firm* — Shapiro IP Law; Joseph Shapiro

(57) ABSTRACT

A salt-level sensor for a water softener salt reservoir (aka brine tank) may comprise a laser distance detector or ultrasonic distance detector, a processor, a wi-fi module, a power module, a memory module, a housing, and a mounting assembly. The salt-level sensor may be configured to be mounted to the underside of the lid of a salt reservoir, with the distance detector directed away from the lid location. The mounting assembly may comprise one or more threaded elements and complementary nut(s), and may additionally comprise an orientation adjustment mechanism.
A method for measuring the salt level in a salt reservoir may comprise installing the salt-level sensor on the underside of the lid; emitting a signal toward to salt; receiving a return signal; and, based on the time between emitting and receiving the signal, determining a distance to the salt.

15 Claims, 18 Drawing Sheets

1500

Install salt-level sensor on underside/inside of lid/covering of water softener brine tank.

At a first time, emit a signal toward bottom or brine tank or salt reservoir
1610

At a second time, receive a return signal from the emitted signal
1620

Determine, based on a difference between the second time and the first time, a distance from the salt-level sensor to the salt or the bottom of the reservoir
1630

FIG. 16

SALT-LEVEL SENSOR FOR WATER SOFTENER

BACKGROUND OF THE INVENTION

Conventional water softeners rely on salt in a brine tank or salt reservoir to function properly. When salt runs our, a water softener is unable to soften water. Some water softener systems may include an integrated salinity sensor that uses Wi-Fi or another communication technology to notify a user's/owner's smartphone of water softener to measure or monitor salt level, e.g., that salt has run out. These softener systems are often very expensive and only notify the end user when it's too late.

Many people who already have a water softener would appreciate the utility of a salt-level sensor, but the cost of upgrading the entire system for a salinity sensor does not justify the added functionality. Although after-market salt-level sensors are available, they are too complicated for the average person to set up, do not have useful connectivity and/or notification functionality (e.g., inability to connect to Wi-Fi), and/or suffer from other significant shortcomings.

For example, U.S. Pat. No. 10,497,248 contains many components and designs that both make the system too expensive to manufacture and too difficult for the average consumer to install themselves. Such systems rely on complicated capacitance-based detection and a mechanical system that physically touches a section of the salt in the vat and lowers as the salt is consumed. Such sensors are bulky, complicated and difficult for the average person to install onto an existing water softener system-if retrofit installation is possible at all. In addition, such systems may be inaccurate because the mechanism assumes that the upper surface of the salt supply in the salt reservoir decreases uniformly and that the upper surface is planar. This is a dangerous assumption. The salt may be consumed unevenly, resulting in an inaccurate salt level measurement.

What is needed is a salt-level sensor that is simple, accurate, effective, retrofittable to any system, and easy to install or integrate.

A salt-level sensor for a water softener salt reservoir (aka brine tank) may comprise a laser distance detector or ultrasonic distance detector, a processor, a wi-fi module, a power module, a memory module, a housing, and a mounting assembly. The salt-level sensor may be configured to be mounted to the underside of the lid of a salt reservoir, with the distance detector directed away from the lid location. The mounting assembly may comprise one or more threaded elements and complementary nut(s), and may additionally comprise an orientation adjustment mechanism.

The salt-level sensor may additionally comprise a communication module, e.g., wi-fi, for communicating with a remote server, and for providing salt-level notifications to a user, e.g., through a smartphone.

A method for measuring the salt level in a salt reservoir may comprise installing the salt-level sensor on the underside of the lid; emitting a signal toward the salt; receiving a return signal; and, based on the rime between emitting and receiving the signal, determining a distance to the salt.

BRIEF DESCRIPTION OF THE DRAWINGS

FIG. 9 shows an exploded top angle view of an exemplary salt-level sensor.

FIG. 15 shows a flowchart for an exemplary method its disclosed herein.

FIG. 16 shows a flowchart for an exemplary method as disclosed herein.

DETAILED DESCRIPTION OF THE INVENTION

Figure 1:
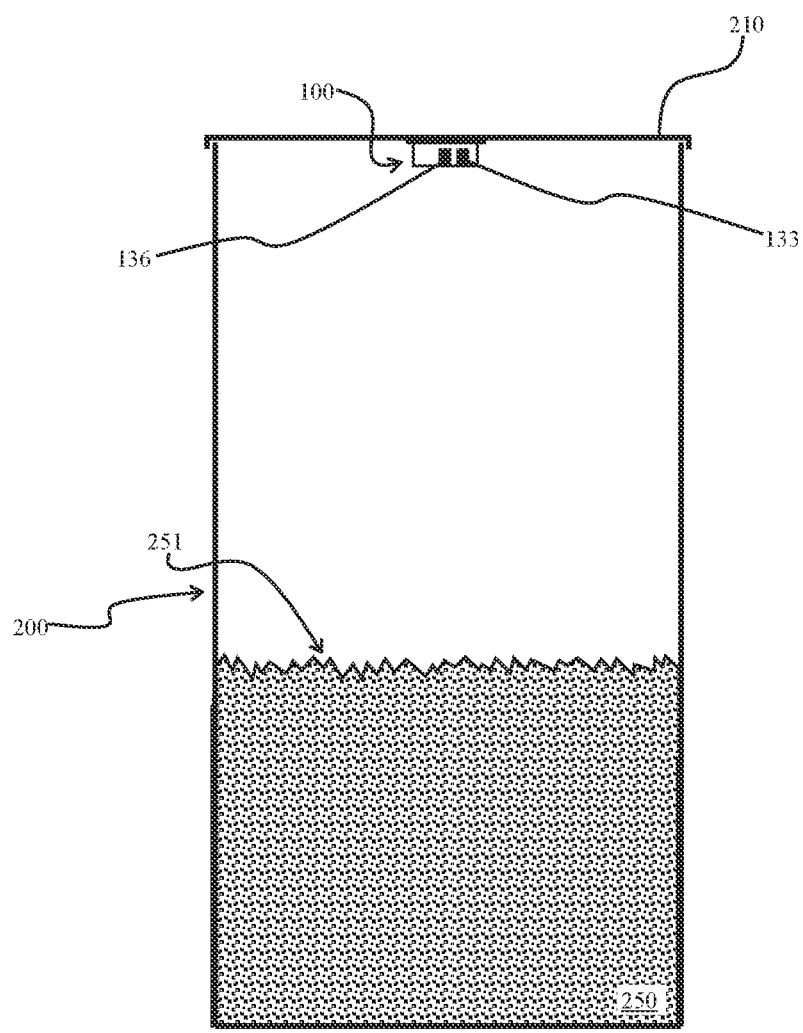
FIG. 1 shows a cross section of a conceptual view of a brine tank with an exemplary salt-level sensor installed.
Figure 2:
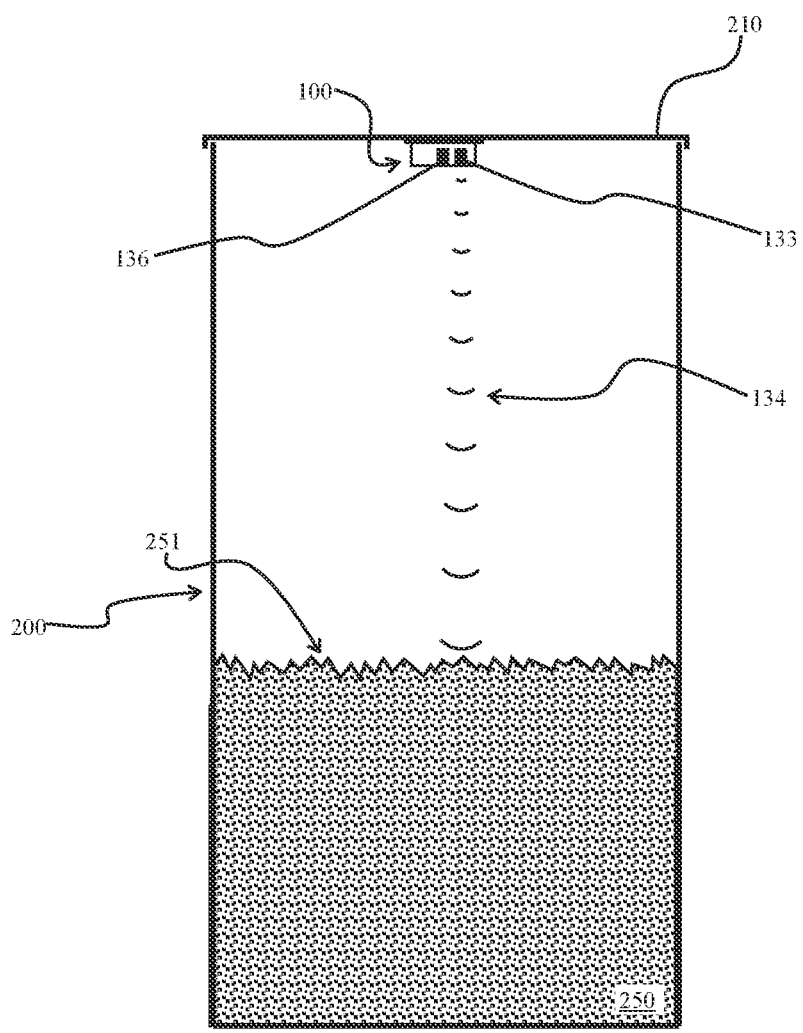
FIG. 2 shows a cross section of a conceptual view of a brine tank with an exemplary salt-level sensor installed, and in which a signal is being emitted.
Figure 3:
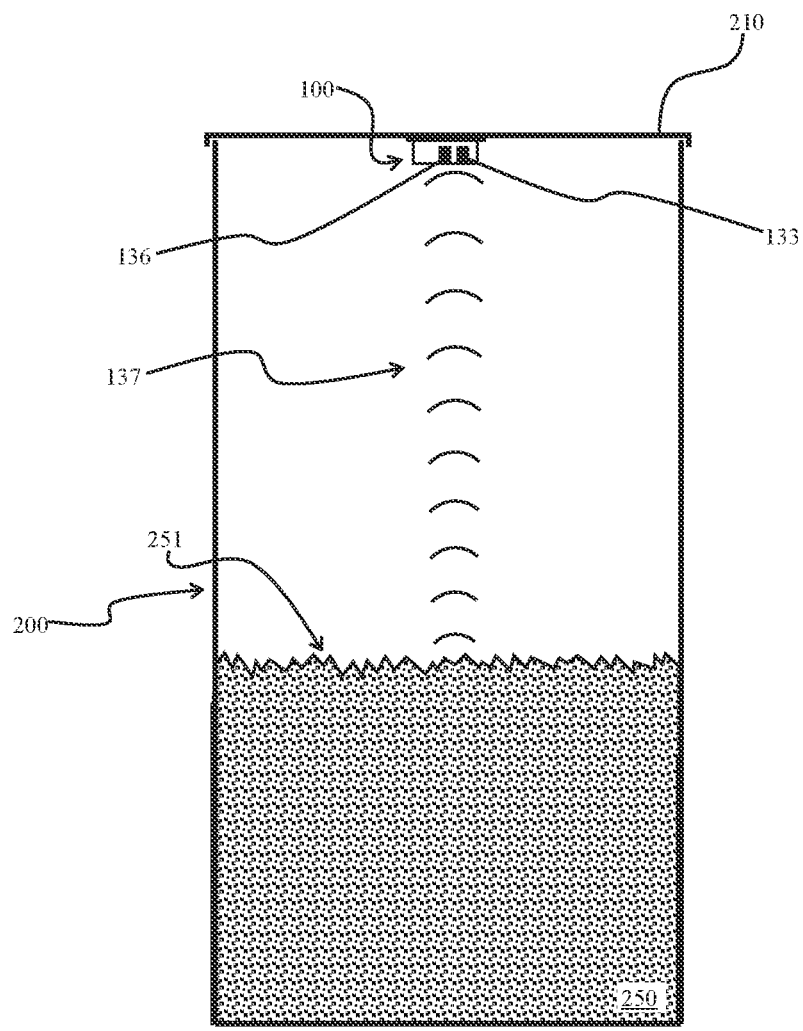
FIG. 3 shows a cross section of a conceptual view of a brine rank with an exemplary salt-level sensor installed, and in which a return signal is being received.
Figure 4:
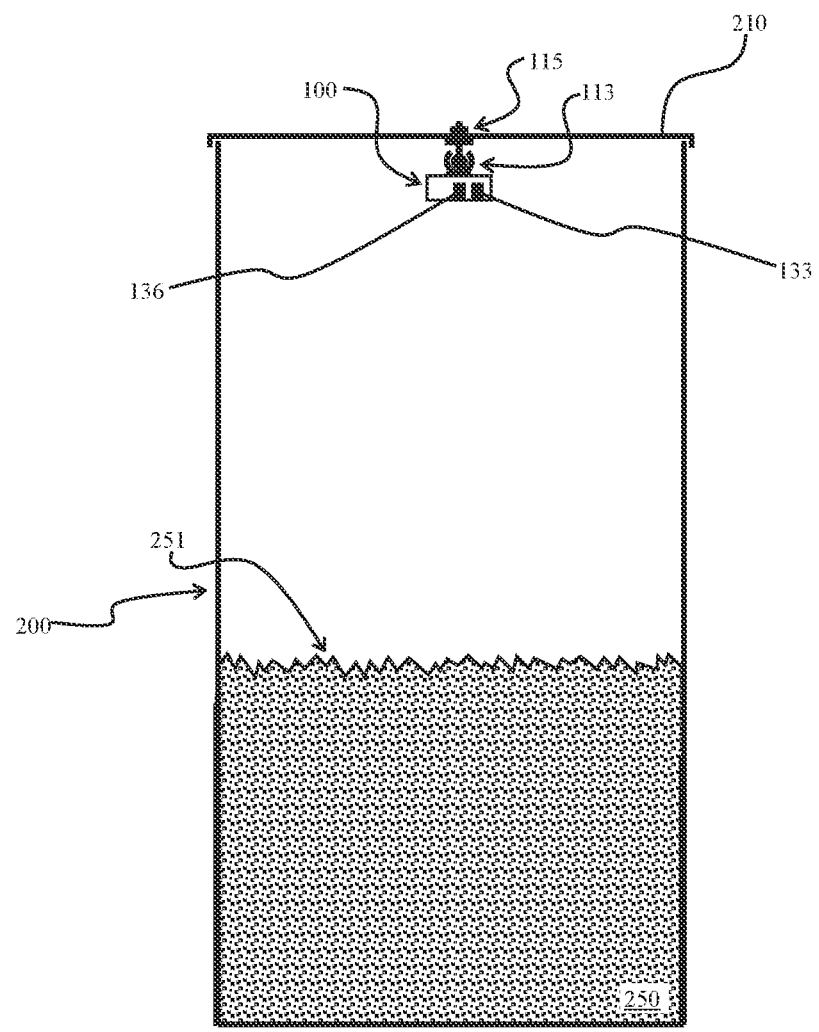
FIG. 4 shows a cross section of a conceptual view of a brine tank with an exemplary salt-level sensor installed, and in which the salt-level sensor comprises an orientation adjustment mechanism.
Figure 5:
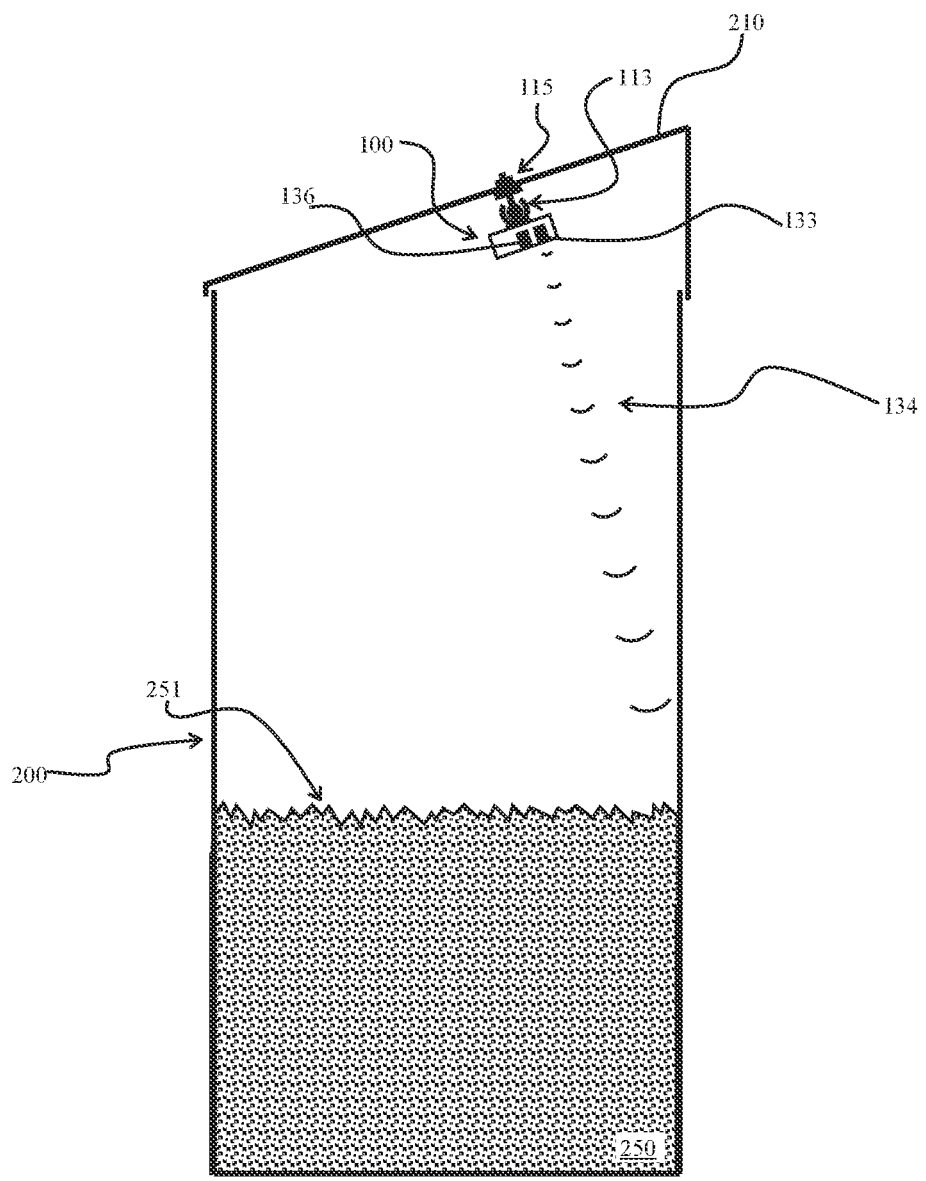
FIG. 5 shows a cross section of a conceptual view of a brine tank having a non-horizontal lid with an exemplary salt-level sensor installed, and in which the salt-level sensor comprises an orientation adjustment mechanism.
Figure 6:
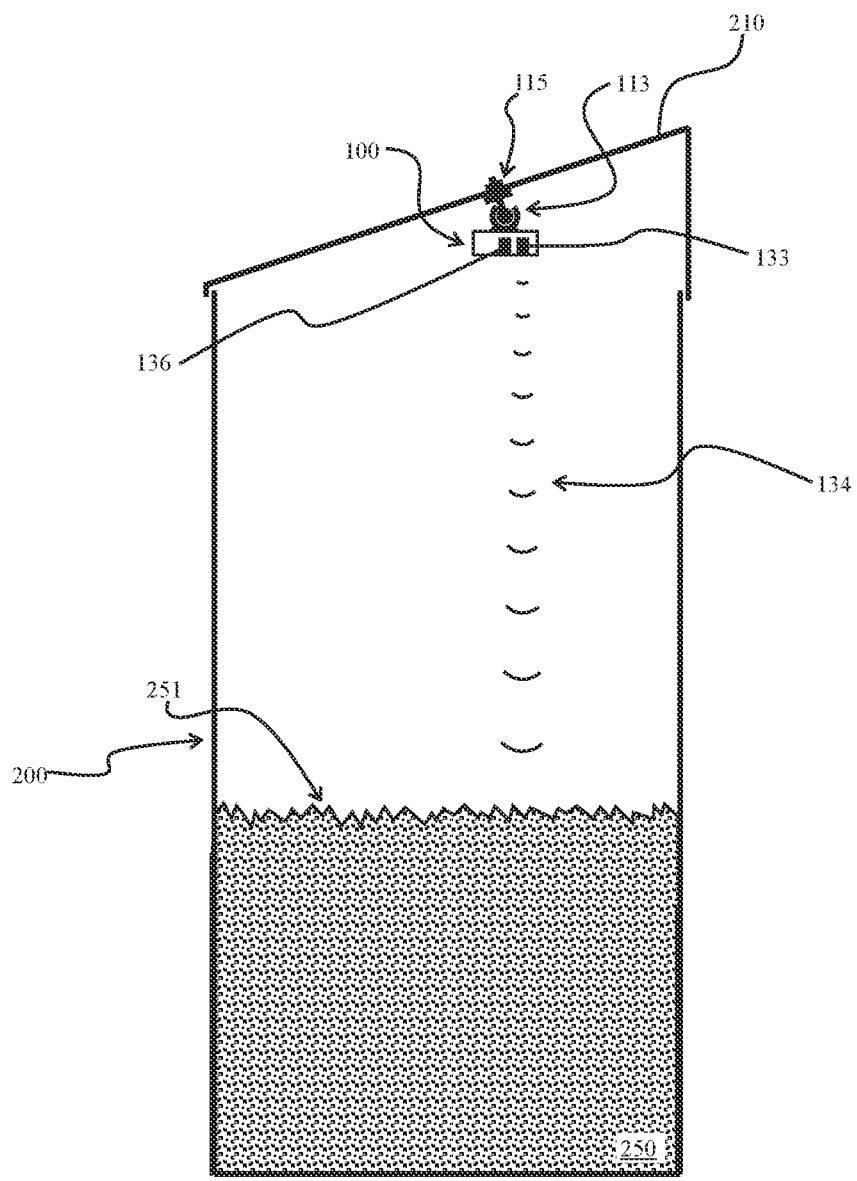
FIG. 6 shows a cross section of a conceptual view of a brine tank having a non horizontal lid with an exemplary salt-level sensor installed, and in which the salt-level sensor comprises an orientation adjustment mechanism and the orientation adjustment mechanism has been used to reorient the salt-level sensor.

This Application claims priority to US. Provisional Application No. 63/131,705, titled "Self-contained Wi-fi Enabled Salt Level Sensor for Water Softeners," and filed on Dec. 29, 2020, and which is incorporated herein by reference in its entirety.

A system and method arc disclosed for an improved salt-level sensor for a water softener.

Table of Reference Numbers from Drawings:

The following table is for convenience only, and should not be construed to supersede any potentially inconsistent disclosure herein.

| Reference Number | Description |
| --- | --- |
| 100 | salt-level sensor |
| 110 | housing |
| 113 | adjustable securement mechanism |
| 114a | ball |
| 114b | socket |

| Reference Number | Description |
| --- | --- |
| 114c | nut |
| 115 | water-softener attachment hardware |
| 120 | power supply port |
| 130 | distance detector |
| 133 | signal emitter |
| 134 | emitted sensor signal |
| 136 | return signal detector |
| 137 | return signal |
| 150 | processor |
| 152 | memory |
| 170 | data transmission module |
| 180 | remote device |
| 190 | remote server |
| 200 | brine tank (salt reservoir) |
| 210 | reservoir lid/covering |
| 250 | salt |
| 251 | upper surface of salt |
| 290 | communications network |

A salt-level sensor may comprise a housing, a securement mechanism, a distance detector, a processor, and a data transmission module.

Housing

In one embodiment, as shown in FIGS. 7a-12, housing 110 may comprise a structure configured to secure distance detector 130, processor 150, and data transmission module 170. Water-softener attachment hardware 115 may be integrated into or secured to housing 110.

Housing 110 may have many shapes and geometries and sizes, and may be made out of many materials. In one exemplary embodiment, housing 110 may be the shape shown in FIGS. 7a-12, and its size may be roughly 2 inches×2 inches×0.5 inches. Housing 110 may be made from plastic, metal, other materials, and/or combinations of materials. In one exemplary embodiment, housing 110 is made from plastic.

Figure 13:
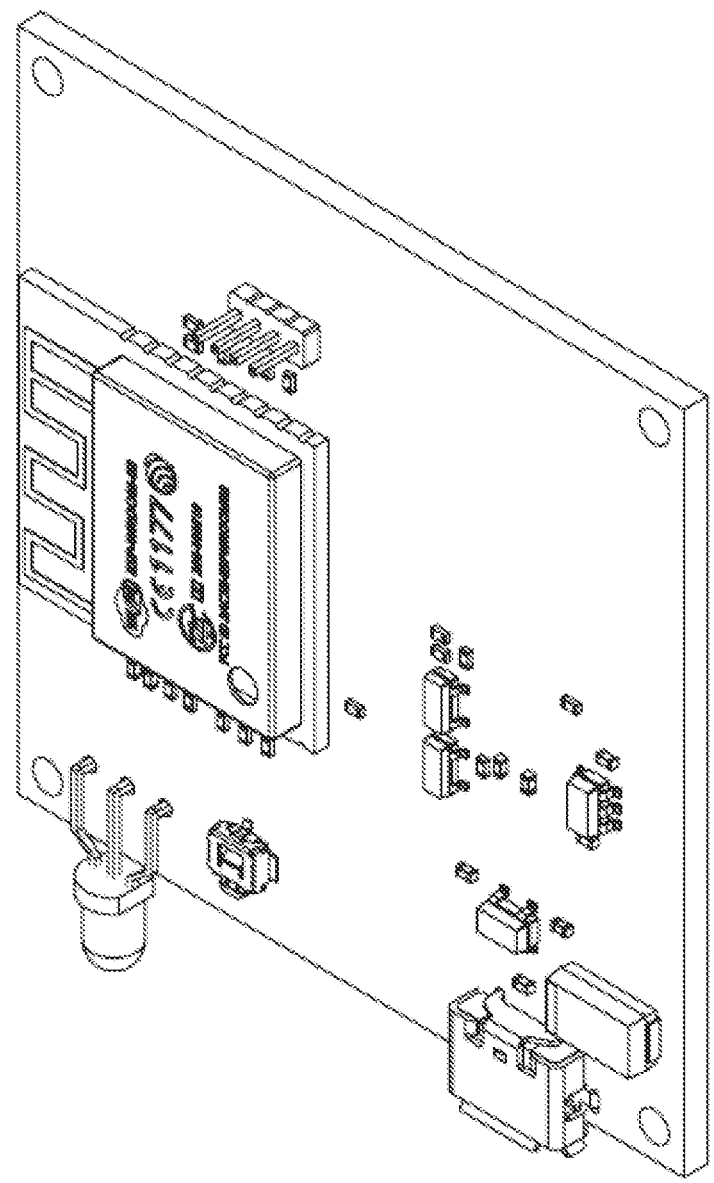
FIG. 13 shows an exemplary organization of the electrical and computing components for an exemplary salt-level sensor.
Figure 14:
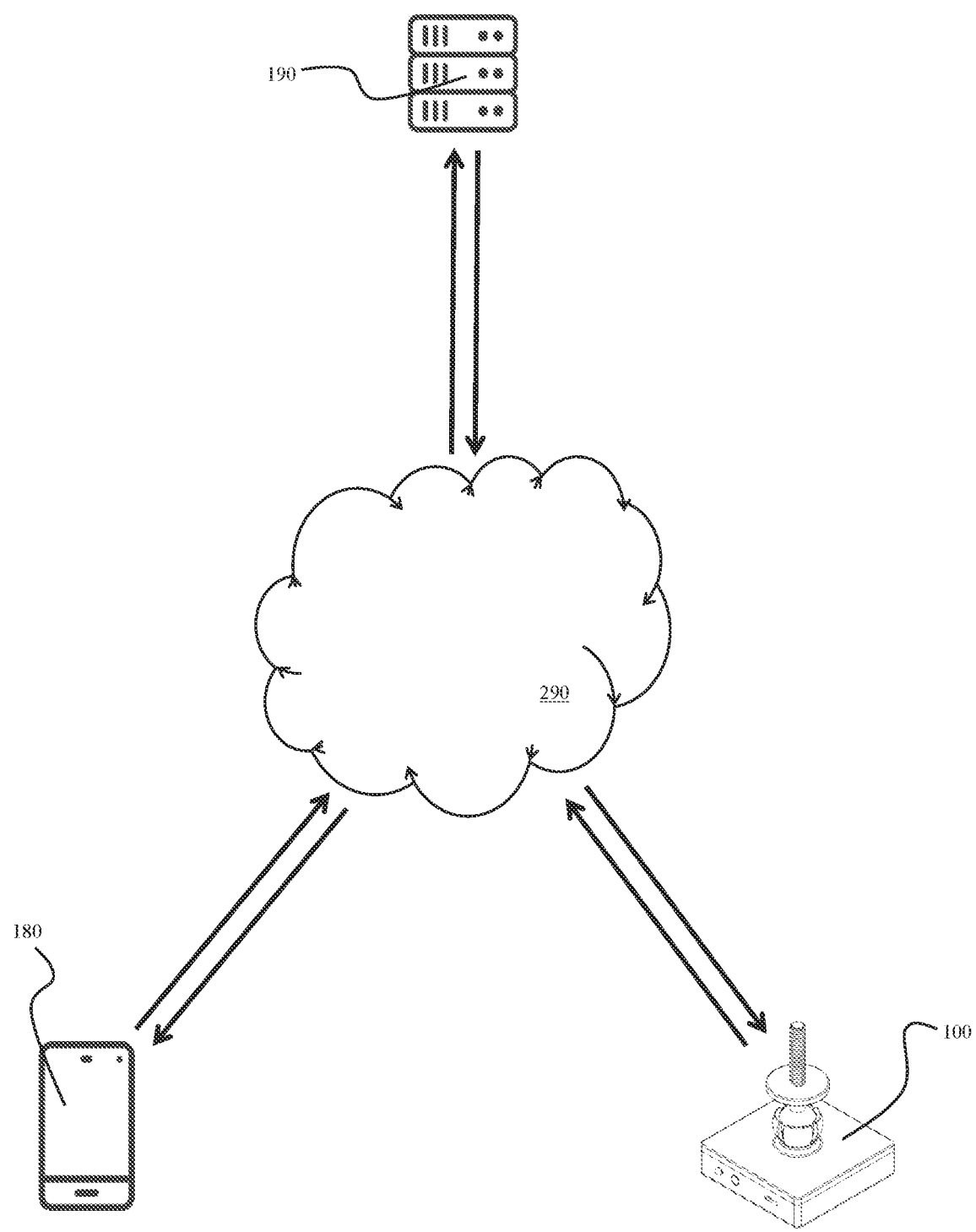
FIG. 14 shows a conceptual communication network for the invention disclosed herein.

Components may be spatially organized and oriented in or around housing 110 in many ways. In one exemplary embodiment, components may be organized as shown in FIG. 13.

In one embodiment, as shown in FIGS. 4-7b and 9-12, housing 110 may be configured to be secured to the underside of reservoir lid 210. In one embodiment, housing 110 may comprise tabs, which may each comprise a hole through which a bolt or other securement mechanism may be used to secure housing 110 to underside of reservoir lid 210, e.g., through securement holes.

In another embodiment, as shown in FIGS. 4-7b and 9-12, housing 110 may have a self-leveling mechanism, or orientation adjustable mechanism 113, so that housing 110 is level inside reservoir 200 and distance detector 130 is thereby directed toward the salt, or so that the orientation of housing 110 may be adjusted so that distance detector 130 is directed toward the salt or otherwise in a desirable direction.

Figure 7A:
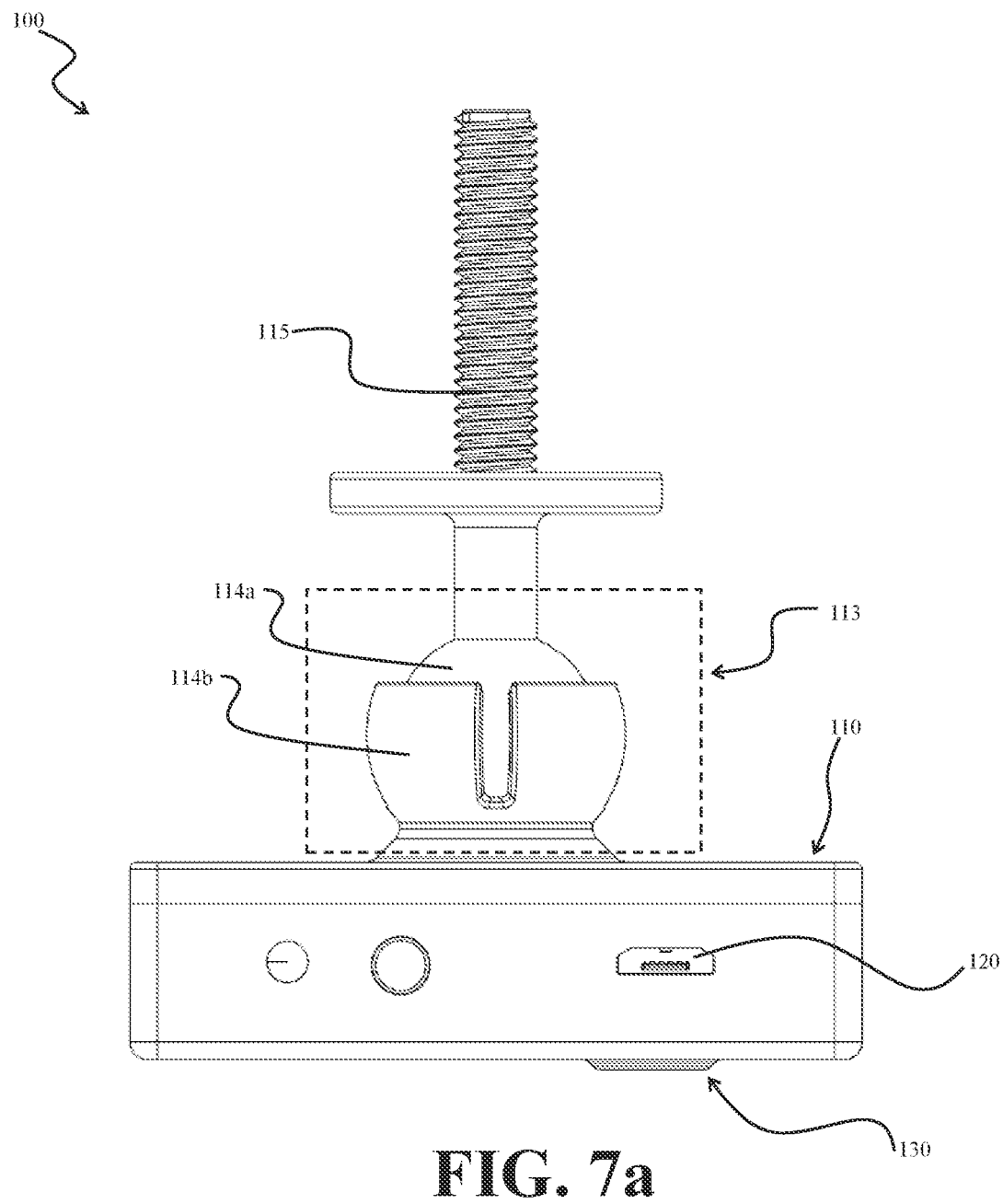
FIG. 7a shows a side view of an exemplary salt-level sensor.
Figure 7B:
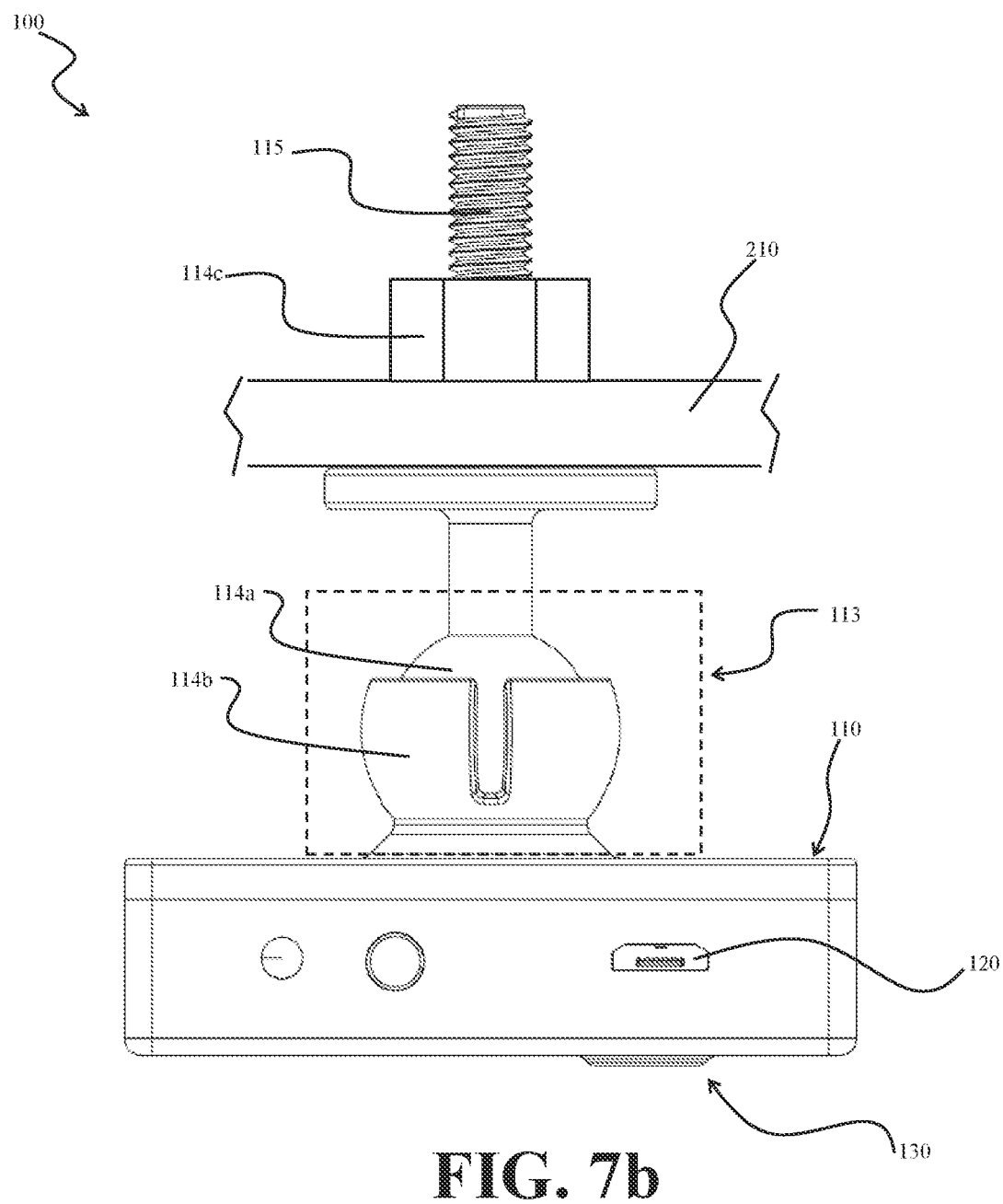
FIG. 7b shows a side view of an exemplary salt-level sensor, including the securement nut.
Figure 8:
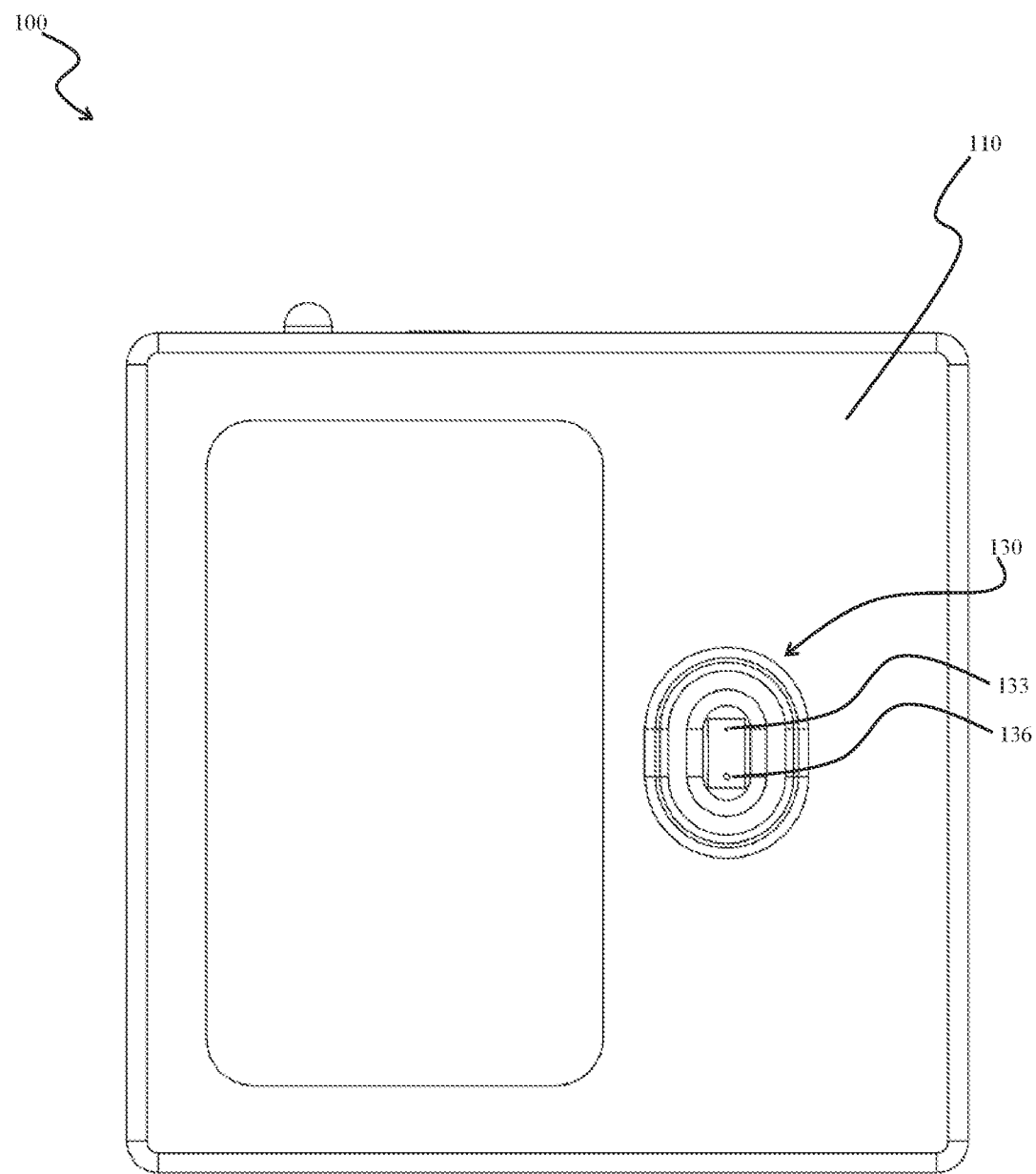
FIG. 8 shows a view of the bottom of an exemplary salt-level sensor.
Figure 9:
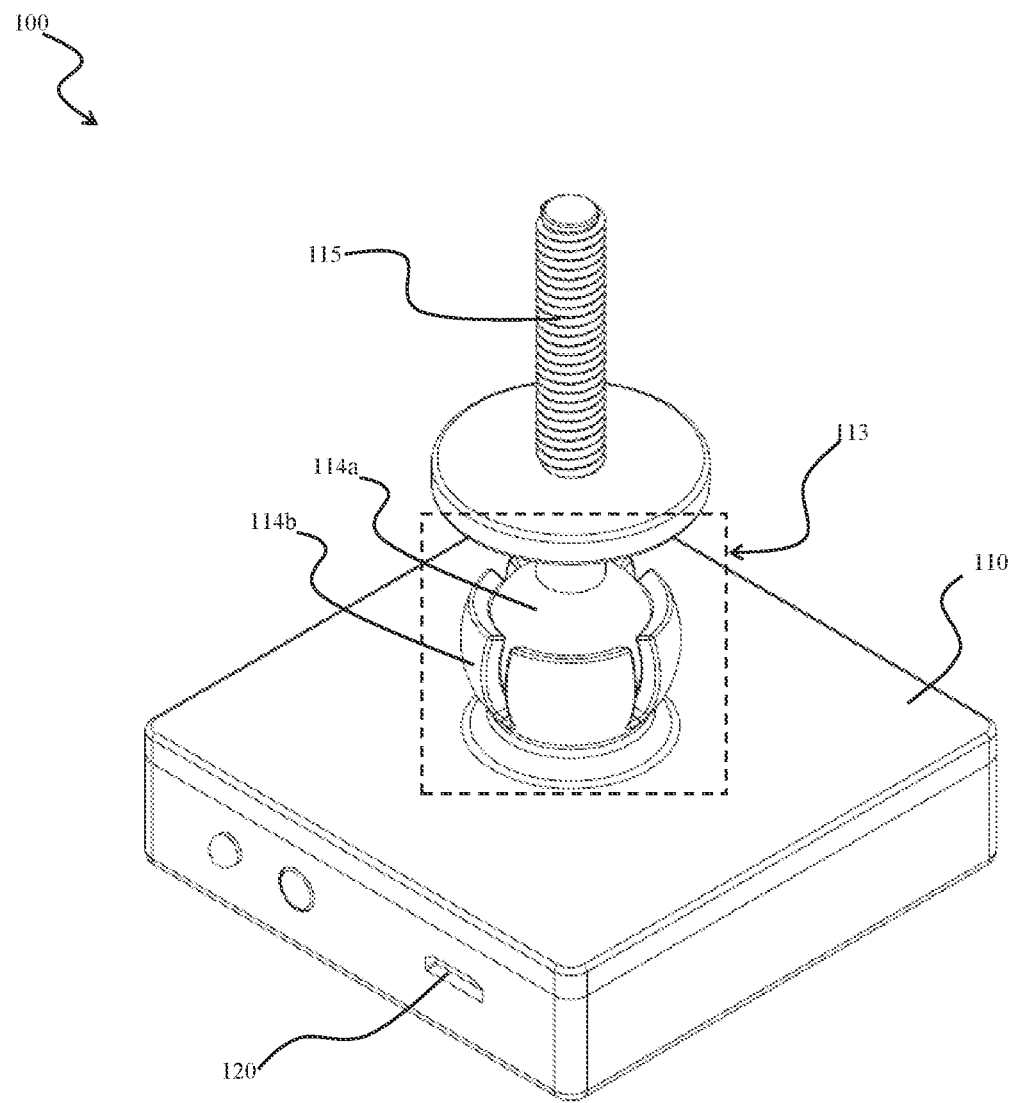
FIG. 9 shows a top-angle view of an exemplary salt-level sensor.
Figure 10:
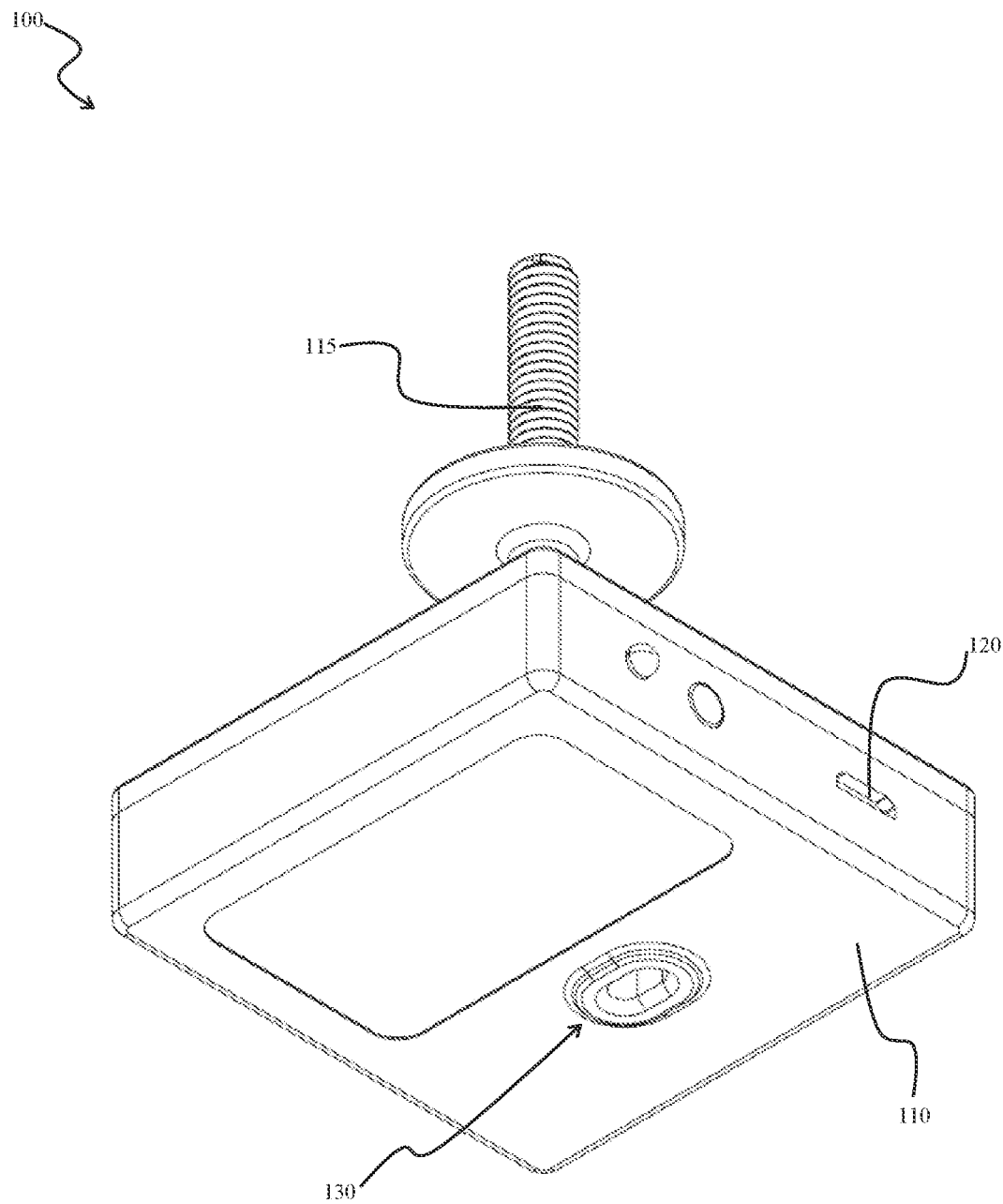
FIG. 10 shows a bottom-angle view of an exemplary salt-level sensor.
Figure 11:
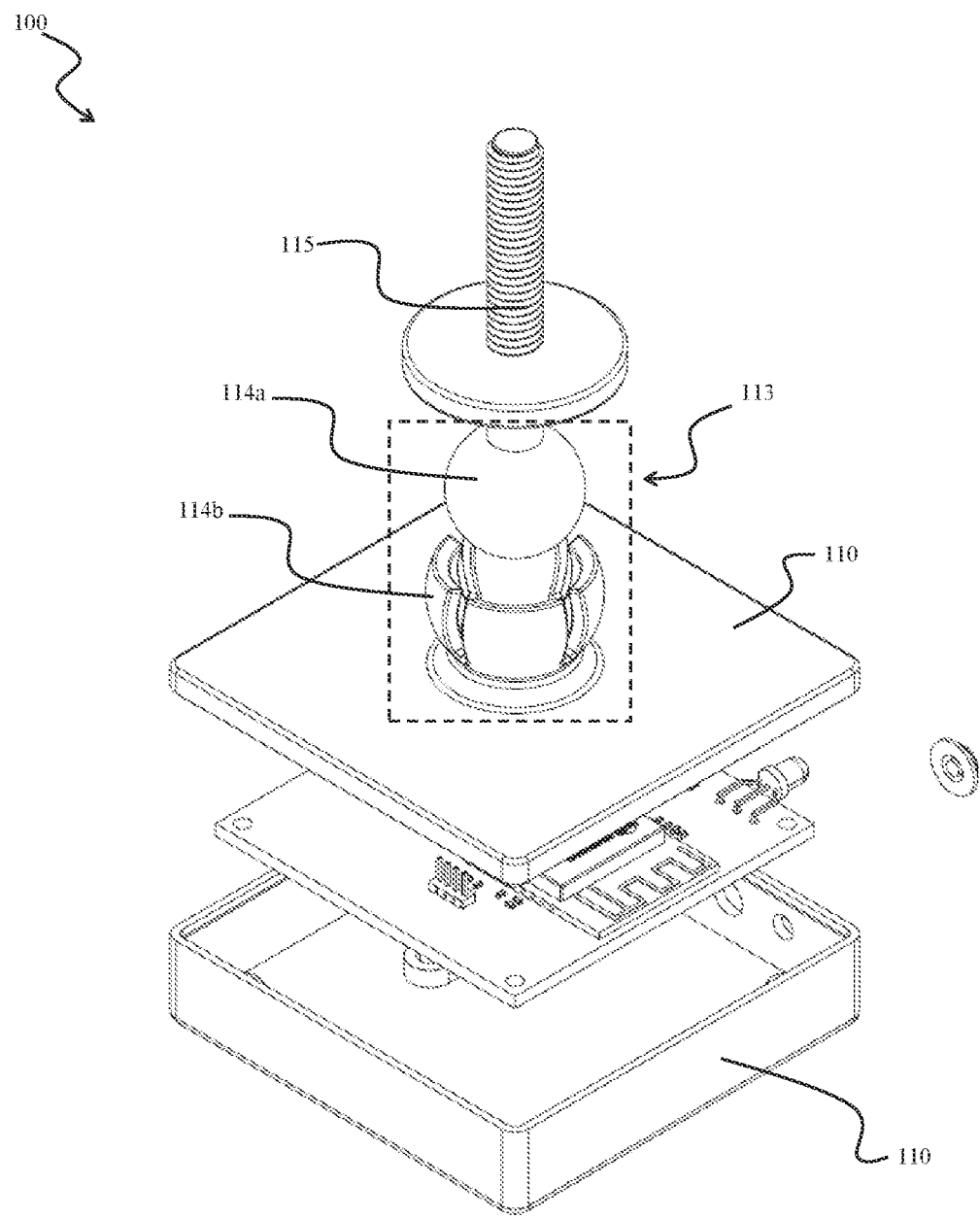
Figure 12:
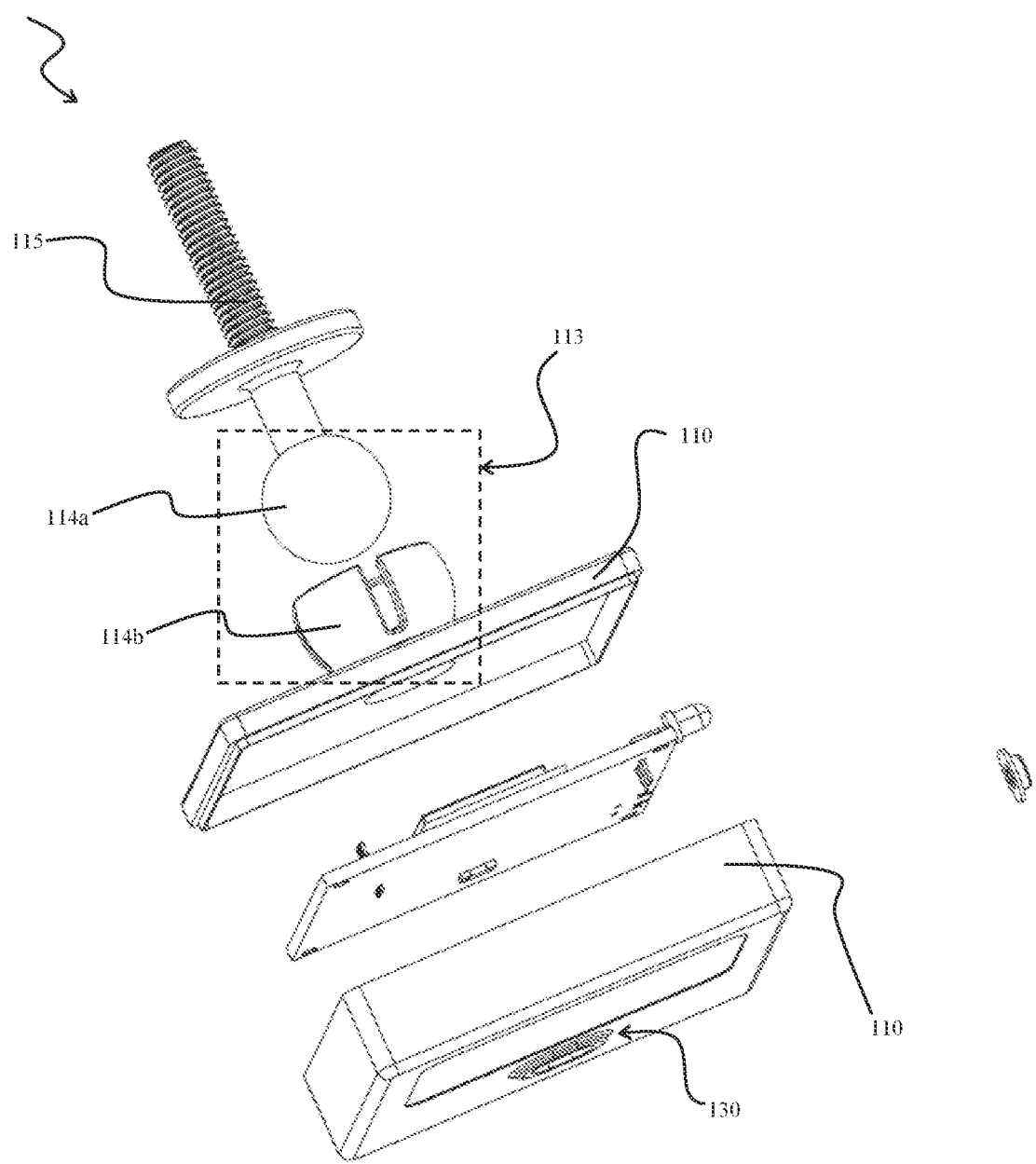
FIG. 12 shows an exploded bottom-angle view of an exemplary salt-level sensor.

In one embodiment, as shown in FIGS. 4-7b and 9-12, the leveling mechanism may comprise a ball-and-socket joint 144a-b that allows sensor 100 to pivot and/or reorient so that it can be angled to face directly at salt level 251, or to face in any desired direction. This ball-and-socket joint may be installed inside lid 210, facing down so that sensor 100 can be adjusted as necessary for an accurate reading. As shown in FIG. 7b, securement mechanism 113 may additionally include nut 114c.

Other types of hardware as may be known in the art may be used to secure housing 110 to inside of reservoir lid 210. In some embodiments, adhesives or other securement mechanisms may be used.

As described herein, configuring housing 110 and orienting distance detector 130 so that housing 110 is secured on the inside/underside of reservoir lid 210 may have several significant benefits: minimizing damage from installation, aesthetics, protection from damage, avoiding an obstruction on the exterior/top of reservoir lid 210, and facilitating proper sensor orientation.

If a sensor is secured on the outside of the lid, a hole must be drilled/made in the lid that is large enough for the sensor to have a sufficiently wide field of view and to function properly. This is in addition to any holes that must be made/drilled for screws or other mounting hardware. Mounting on the inside of the lid, however, requires only a hole(s) for mounting hardware, but does not require a hole for the sensor.

An internal installation also looks better aesthetically by hiding the sensor on the inside and making it barely noticeable.

For water softeners installed outside of a home or structure, e.g., in California, Texas, Florida and/or other locations, an internal installation may protect the sensor from the elements.

Additionally, on some water softeners, e.g., cabinet water softeners, on which the exterior of the lid is not parallel to the salt surface, external installation may result in an incorrectly oriented sensor, i.e., the sensor may be directed toward the side of the tank, or in some other direction other than toward the salt surface. This is a fundamental flaw in an external design and would cause the sensor to not retrofit to a large number of water softeners, especially with the increasing popularity of cabinet water softeners. An internally mounted sensor avoids problems with the external lid topography.

As shown in FIGS. 4-7, a sensor 100 with an adjustable orientation mechanism 113 may allow a sensor 100 installed on the inside of lid 210 to be adjusted so that, regardless of the orientation characteristics of the lid, the sensor is directed toward salt 230.

In one embodiment, an adjustable securement mechanism 113 may comprise a ball-and-socket adjustable joint 114a-b. FIGS. 7a-b and 9-12 show details of an exemplary ball-and-socket joint 114a-b. In one embodiment, socket 114b may be made from plastic and may be designed and configured to have flexing properties so that ball 114a may be inserted into and/or removed from socket 114b by applying pressure.

Similar mechanisms are known in the art and may be referred to as, e.g., a "swivel ball joint," a "ball-and-socket joint," and/or a "ball socket."

Other orientation adjustment mechanisms may be used and are known in the art

Distance Detector

Distance detector 130 may comprise an ultrasonic distance detector, or a laser distance detector, or any other detector that works by emitting a signal, receiving that signal after it interacts and object and "bounces back," and measuring the time between emission of the signal and receipt of the bounce-back signal.

In one embodiment, distance detector 130 may be a laser-based distance detector, e.g., an STMicroelectronics VL53L0X time-of-flight ranging and gesture detection sensor.

In another embodiment, distance detector 130 may be an ultrasonic distance detector, e.g., an HCSR04 5V Ultrasonic ranging module.

As shown in FIGS. 4-7b, distance detector 130 may be oriented so that emitted signal 134 is directed toward upper surface 251 of sail 250, i.e., the top surface of salt 250 in salt reservoir 200. Although emitted signal 134 may be directed toward any point on the upper surface of salt 250, it may lie desirable to orient distance detector 130 so that emitted signal 134 is directed toward the center (or a central location) on the upper surface 251 of salt 250. In general, distance detector 130 may be directed toward any location on upper surface 251 of salt 250 as may be desirable based on the characteristics and constraints of a specific application.

Distance detector 130 may be configured, either by itself or upon a signal from processor 150, to emit a signal 134 and receive a bounce-back response signal 137, and to provide to processor 150 notifications of such events, or the elapsed time between such events, to be used for determining a distance from distance detector 130 to salt 250 in reservoir 200. The sampling frequency or schedule for distance detector 130 may be configured by distance detector 130, processor 150, or otherwise.

Processor

Processor 150 may include memory 152. Memory 152 may be configured to store, e.g., instructions for execution by the processor, collected data, and/or processed data.

In one embodiment, processor 150 may be in communication with distance detector 130 and may thereby receive from distance detector 130 a notification that distance detector 130 has emitted a signal 134 and a notification that distance detector received a response (bounce-back) signal 137. Using a timer, processor 150 may determine the time that elapsed between the time that distance detector 130 emitted a signal 134 and the time that distance detector 130 received the response signal 137.

Salt sensor 100 may require calibration, in one embodiment, a user may input the depth of salt reservoir 200, or distance detector 130 may measure the depth of salt reservoir 200 in an empty state. Salt sensor 100 or another computing device may determine the percentage hill by comparing the known reservoir depth to the measured distance to the upper surface 251 of salt pile 250.

Additionally, in some embodiments, the user may be able to manually adjust calibration if the user observes or believes that the calibration is incorrect. For example, if salt sensor 100 measures that the salt reservoir is 50% full, but a user believes that the measurement should be 40% full, the user may input the 40% value into salt sensor 100 to correct calibration.

In some embodiments, processor 150 may use data transmission module 170 to transmit distance timing data to a remote device 180, e.g., a smartphone 180, router, and/or server 190. In some embodiments processor 150 may perform data processing operations before transmitting distance timing data to a remote device 180/190. In other embodiments processor 150 may do only minimal processing before using data transmission module 170 to transmit distance timing data to a remote device 180 or 190. Data processing may be distributed in many ways between processor 150 and remote device 180/190 without departing from the scope of this disclosure.

Data Transmission Module

Figure 17:
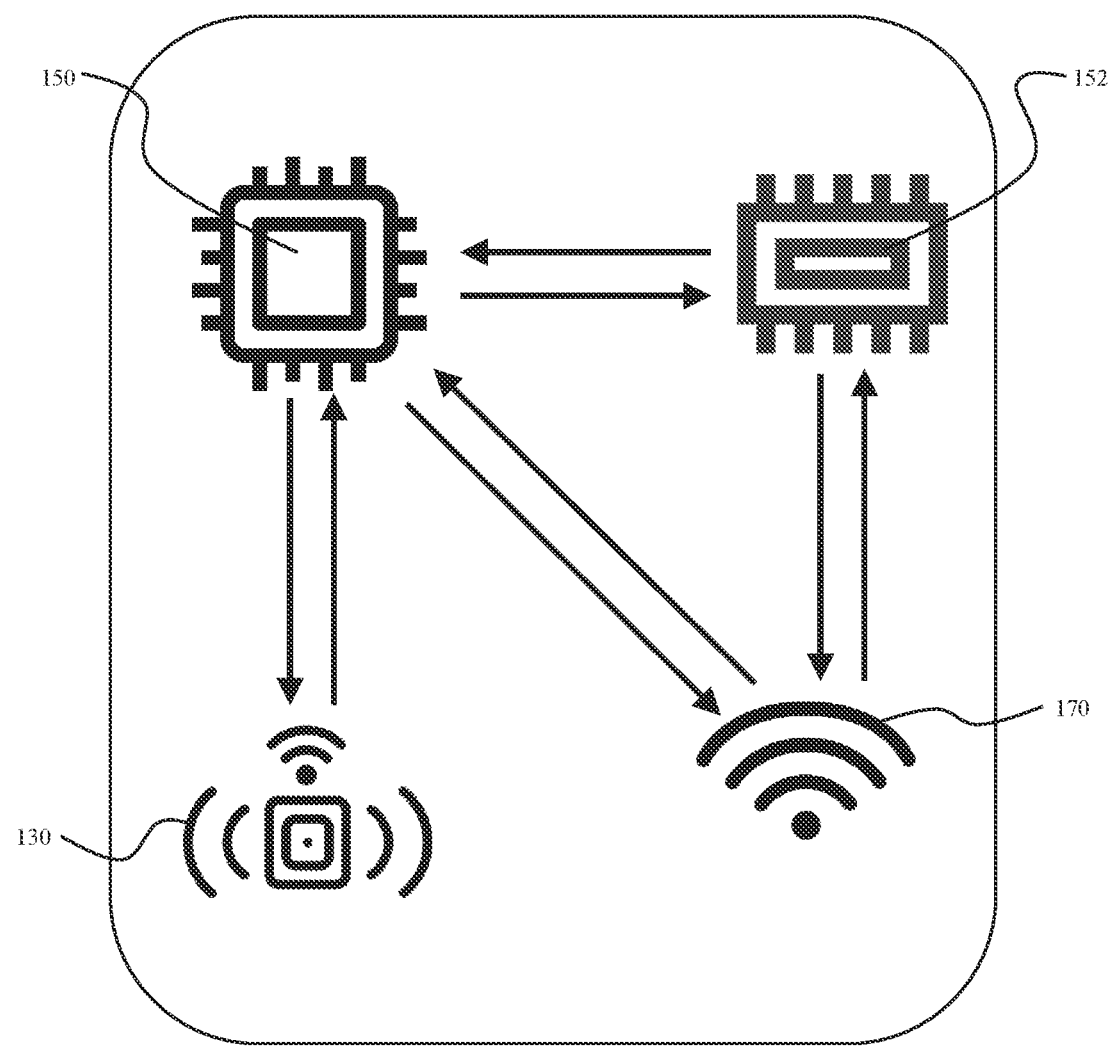
FIG. 17 shows a conceptual view of electronic components for an exemplary salt-level sensor.

As shown in FIG. 17, data transmission module 170 may be connected to processor 150 in any of the many ways that are well known in the art. Data transmission module 170 may be configured to implement a data communication (transmission and reception) technology, e.g., Wi-Fi, Bluetooth, NFC, RFID, wired communications, and/or any other of the many data communications technologies that are known in the art. In one exemplary embodiment, data transmission module 170 may use Wi-Fi.

Data transmission module may be configured to transmit distance timing data, either raw, processed, or a combination of raw and processed, to a remote server 190. Remote server 190 may store instructions that, when executed, cause server 190 to receive and process distance timing data received from data transmission module 170. Processing may comprise determining, based on one or more samples received from the distance detector, a salt level, a salt amount, a salt usage rare, a predicated date/time for running out of salt, a suggestion for an amount of salt to replenish the reservoir, a distance from distance detector 130 to salt 250 in reservoir 200, and/or any other determination that may be related to a salt level in the water softener salt reservoir.

Remote server 190 may then transmit notifications or other information based on the received, and possibly processed, distance timing data. Such notifications and/or information may include, but are not limited to, a notification that the salt reservoir is empty; a notification that the salt reservoir is low; a notification of the amount of salt in the reservoir; a predicted data/time when the salt in the reservoir will run out: a suggestion for how much salt to acquire to replenish the salt reservoir, and/or any other information or notification that may be related to the salt level in the reservoir.

Power

In some embodiments, housing 110 may include a power source to power distance detector 130, processor 150, and/or other components of salt-level sensor 100 that may require power. Many power sources are known and may be used, e.g., a battery, a wire for plugging into an electrical outlet, etc. In one exemplary embodiment, as shown in FIGS. 7*a-b* and 910, a power port 120 (e.g., USB) may be used. In other embodiments a battery may be used.

Methods

As shown in FIG. 15, an exemplary method for using a salt-level sensor 100 to measure the salt level in a water softener brine tank may comprise:

At step 1510, a salt-level sensor may be installed on the underside of lid 210 of brine tank 200. As disclosed herein, installation may comprise using securement hardware, adhesive, magnets, or any other securement technology known in the art.

As shown in FIG. 16, an exemplary method for measuring using a salt level sensor to measure the salt level in a brine tank for a water softener may comprise, using a salt-level sensor 100 mounted on the underside of a lid 210 of brine tank 200:

At step 1610, emitting, at a first time, a signal toward the bottom of the salt reservoir.

At step 1620, receiving, at a second time, a return signal from the emitted signal.

At step 1630, determining, based on a difference between the second time and the first rime, a distance from the salt-level sensor to the salt or the bottom of the reservoir. As described herein, this computation may be made on a processor at the salt-level sensor, or on a remote device, or on a remote server, or on any other computing device to which data from the salt-level sensor may be transmitted.

What is claimed is:

1. An apparatus, comprising:
a mounting housing; and
a distance detector comprising a directional signal emitter and a signal sensor;
wherein:
the distance detector is secured to the mounting housing;

the mounting housing is configured to be mounted to a lid surface; and the signal emitter is oriented to emit a signal in a direction that is away from the lid surface;

the mounting housing comprises an orientation adjustment mechanism.

2. The apparatus of claim 1, wherein the distance detector is a laser distance detector.

3. The apparatus of claim 1, wherein the distance detector is an ultrasonic distance detector.

4. The apparatus of claim 1, wherein the orientation adjustment mechanism is a ball-and-socket joint.

5. The apparatus of claim 1, wherein the mounting housing comprises at least one threaded element and a complementary nut configured to secure the mounting housing to the lid.

6. A method for measuring the salt level in a water softener salt reservoir, comprising:

installing a salt-level sensor on the underside of a lid for a salt reservoir;

wherein:

the salt-level sensor comprises:

a mounting housing; and a distance detector comprising a directional signal emitter and a signal sensor;

the distance detector is secured to the mounting housing;

the mounting housing is configured to be mounted to a lid surface;

the signal emitter is oriented to emit a signal in a direction that is away from the lid surface;

the mounting housing comprises an orientation adjustment mechanism.

7. The method of claim 6, wherein the distance detector is a laser distance detector.

8. The method of claim 6, wherein the distance detector is an ultrasonic distance detector.

9. The method of claim 6, wherein the orientation adjustment mechanism is a ball-and-socket joint.

10. The method of claim 6, wherein the mounting housing comprises at least one threaded element and a complementary nut configured to secure the mounting housing to the lid.

11. A method for measuring the salt level in a water softener reservoir, comprising:

using salt-level sensor mounted on the underside of a lid of a water softener reservoir;

emitting, at a first time, a signal toward the bottom of the salt reservoir;

receiving, at a second time, a return signal from the emitted signal; and determining, based on a difference between the first time and the second time, a distance from the salt-level sensor to the reservoir salt or the bottom of the reservoir;

wherein the salt-level sensor is mounted using a mounting mechanism that comprises an orientation adjustment mechanism.

12. The method of claim 11, wherein the salt-level sensor comprises a laser distance detector.

13. The method of claim 11, wherein the salt-level sensor comprises an ultrasonic distance detector.

14. The method of claim 11, wherein the orientation adjustment mechanism is a ball-and-socket joint.

15. The method of claim 11, wherein the salt-level sensor is mounted using a mounting mechanism that comprises at least one threaded element and a complementary nut.

\* \* \* \* \*